Patented Sept. 9, 1947

2,427,286

UNITED STATES PATENT OFFICE 2,427,286

INSECTICIDE AND METHOD OF USING

William A. Knapp, New York, N. Y., and Leon J. Heuser, Glen Ridge, N. J., assignors to General Chemical Company, New York, N. Y., a corporation of New York No Drawing. Application April 28, 1943,
Serial No. 484,864

11 Claims. (Cl. 167—33)

This invention relates to insecticides. It is particularly directed to a new class of insecticidal compounds for combatting insects, especially insects susceptible to control by stomach poison insecticides, such as the chewing insects, e. g., larvae of moths and butterflies, and larval and adult beetles; insects which feed on exposed liquids and solids such as the housefly and fruit fly; or sucking insects, such as thrips, which lacerate the epidermis of plants and suck up the exuding sap.

In accordance with this invention it has been found compounds containing in their structure the grouping

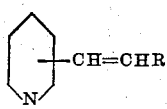

in which the CH=CHR radical is attached to the nucleus in either the α- or γ-position, and R denotes an organic radical, preferably one containing between 3 and 9 carbon atoms, possess insecticidal properties, particularly against insects of the type above referred to.

The insecticidal action of the compounds of our invention is particularly surprising in view of the statement made in the News edition of the American Chemical Society of January 25, 1941, to the effect that studies on insecticidal materials of the nicotine type in which the pyridine nucleus is substituted in the β-position support a conclusion that "only among those pyridine derivatives in which linkage occurs through the β-position of the pyridine ring may one expect to find marked insecticidal action. It is seldom that one finds a correlation so apparently definite as this between chemical structure and insecticidal action."

Compounds which may be employed in accordance with this invention may be any compound containing in its structure the grouping

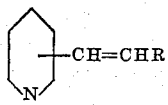

in which the CH=CHR radical is attached to the nucleus in either the α- or γ-position, and R denotes an organic radical which may or may not contain an inorganic substituent, e. g., an alkyl group, a cycloaliphatic radical, an aryl or aralkyl radical or a heterocyclic grouping; preferably, R in the above formula contains from 3 to 9 carbon atoms. Compounds in which the pyridine nucleus is condensed with one or more substituted or unsubstituted aromatic nuclei in order to form quinoline-type compounds are included within the scope of the invention, as well as compounds in which one or more of the hydrogen atoms of the pyridine nucleus is substituted by a substituent in addition to the —CH=CHR radical, e. g., by a halogen atom or an organic radical such as an alkyl radical; accordingly, the symbol

is employed throughout the specification and claims to include substituted, as well as unsubstituted, pyridine nuclei and the symbol

to include substituted, as well as unsubstituted, benzene nuclei. As specific examples of compounds which may be employed there may be mentioned α-benzal picoline, γ-benzal picoline, α-furfural picoline, α-cinnamal picoline, α-citral picoline, α-n-butyral quinaldine, α-heptal quinaldine, α-furfural quinaldine, α-benzal quinaldine, α-citral quinaldine, and α-cinnamal quinaldine. These compounds may be prepared in any suitable manner, but are most conveniently prepared by condensation of a compound containing in its structure the grouping

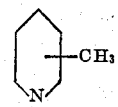

in which the methyl group is attached to either the α- or γ-position, e. g., α- or γ-picoline, or α- or γ-quinaldine, with an aldehyde.

The insecticides of the present invention may be applied to the host, e. g., fruit or foliage, or to other food of the insect, if a chewing insect is being combatted; if insects such as aphids, spiders, etc., are to be exterminated, the insecticides are preferably sprayed on the infested plant. They are compatible with and therefore may be used in combination with other stomach insecticides, contact insecticides, fungicides and supplementary materials such as hydrated lime, diluents, sticking, spreading and wetting agents, etc., commonly used in combination with insecticides. They may be applied in the form of solutions thereof in organic solvents such as acetone or in the form of aqueous dispersions, or may be dispersed in dry form as dusts.

The compounds of the present invention are relatively stable under the usual conditions of use. They possess very low solubility in water and, hence, are not easily removed from the fruit or foliage by rain. These compounds are non-toxic to warm-blooded animals.

Several compounds coming within the scope of this invention were tested as contact poisons against aphids by spraying nasturtium or chrysanthemum leaves infested with green cabbage aphids or black bean aphids, with an aqueous dispersion of the insecticide to be tested, a sodium salt of an ester of a sulfonated polycarboxylic acid being employed as the emulsifying agent. After spraying, the leaf was placed on fine-mesh, bleached cheesecloth which had been stretched over embroidery hoops. The petiole of the leaf was inserted through a small opening into a dish containing water to prevent wilting, and the leaf was covered with a large Petri dish and permitted to stand for twenty-four hours, at the end of which time a count was made. Percentage control was calculated in accordance with the formula:

$$\text{Per cent control} = 100\left(\frac{X-Y}{X}\right)$$

wherein X equals the percentage living on the check leaf and Y the percentage living on the treated leaf.

Compounds coming within the scope of this invention were also tested as contact poisons against greenhouse red spiders by spraying trifoliate rose leaves infested with the spiders with an aqueous suspension of the insecticide to be tested, prepared with the aid of the emulsifying agent above described, care being taken to insure wetting of both the upper and lower leaf surfaces. After spraying, the petiole of each leaf was inserted in water and after twenty-four hours the living and dead spiders were counted with the aid of a microscope and the percentage control calculated as above set forth.

The results of the above tests are indicated in the following table. The initials "G. C. A." denote green cabbage aphid, "B. B. A." denote black bean aphid, and "G. R. S." denote greenhouse red spider.

| Insect | Insecticide | Concentration | Control |
|---|---|---|---|
| | | | Per cent |
| G. C. A. | α-heptal quinaldine | 1:800 | 100.0 |
| G. C. A. | α-furfural quinaldine | 1:800 | 80.5 |
| G. C. A. | α-n-butyral quinaldine | 1:800 | 93.2 |
| G. C. A. | α-furfural picoline | 1:800 | 98.8 |
| G. C. A. | α-citral picoline | 1:800 | 98.2 |
| B. B. A. | α-heptal quinaldine | 1:400 | 96.9 |
| B. B. A. | α-cinnamal picoline | 1:200 | 99.3 |
| B. B. A. | γ-benzal picoline | 1:200 | 96.3 |
| G. R. S. | α-furfural quinaldine | 1:800 | 88.9 |
| G. R. S. | do | 1:400 | 100.0 |
| G. R. S. | α-furfural picoline | 1:400 | 100.0 |

The following table illustrates the stomachic toxicity of compounds coming within the scope of this invention. The compounds enumerated below were tested against codling moth larvae using the "whole apple" method by spraying an 0.5% solution of the compounds in acetone on each of five apples, permitting the acetone to evaporate, and then infesting each apple with five newly hatched codling moth larvae. At the end of ten days the fruit was cut open and examined for worms. Tests were also made by applying the insecticide to the apple as an aqueous emulsion prepared with the aid of the emulsifying agent above described. The results of these tests were as follows:

| Insecticide | Method of Application | Concentration | Control |
|---|---|---|---|
| | | | Per cent |
| α-furfural picoline | Acetone solution | 1:200 | 93.9 |
| Do | Aqueous suspension | 3:800 | 100.0 |
| α-furfural quinaldine | Acetone solution | 1:200 | 100.0 |
| Do | Aqueous suspension | 3:800 | 94.7 |

It will be evident from the above description that our invention provides a group of new and highly effective insecticide materials.

Since certain changes may be made in the compositions above described without departing from the scope of the invention, it is intended that all matter contained in the above description shall be interpreted as illustrative and not in a limiting sense.

We claim:

1. An insecticide comprising an aqueous dispersion containing an emulsifying agent and α-heptal quinaldine.

2. An insecticide comprising an aqueous dispersion containing an emulsifying agent and α-furfural picoline.

3. An insecticide comprising an aqueous dispersion containing an emulsifying agent and α-furfural quinaldine.

4. The method of combatting codling moth larvae which comprises applying to the insect host α-furfural quinaldine.

5. The method of combatting sucking insects which comprises spraying the insects with an aqueous emulsion containing α-heptal quinaldine.

6. The method of combatting sucking insects which comprises spraying the insects with an aqueous emulsion containing α-furfural picoline.

7. An insecticide comprising an aqueous dispersion containing an emulsifying agent and as an active insecticidal ingredient a compound selected from the group consisting of—

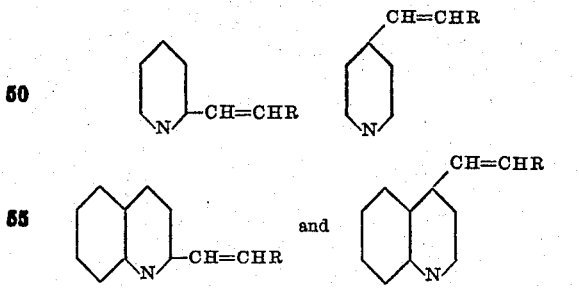

in which R denotes an organic radical containing from 3 to 9 carbon atoms.

8. The method of combatting chewing insects which comprises applying to the insect host a compound selected from the group consisting of—

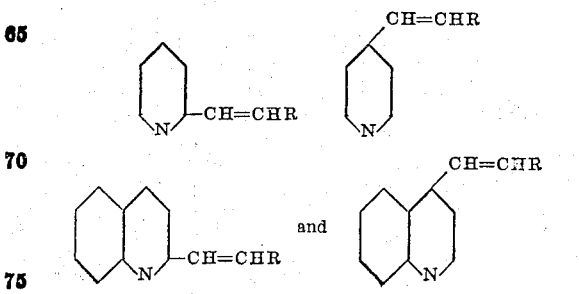

in which R denotes an organic radical containing from 3 to 9 carbon atoms.

9. The method of combatting codling moth larvae which comprises applying to the insect host a compound selected from the group consisting of—

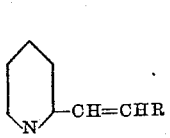 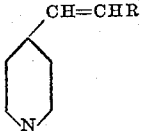

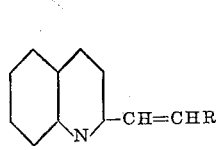 and 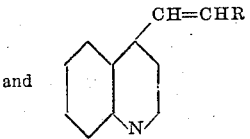

in which R denotes an organic radical containing from 3 to 9 carbon atoms.

10. The method of combatting sucking insects which comprises spraying the insects with a composition comprising a compound selected from the group consisting of—

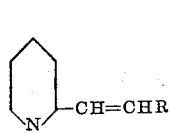 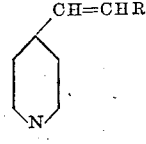

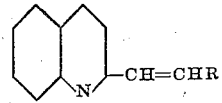 and 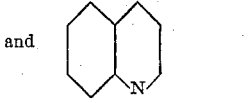

in which R denotes an organic radical containing from 3 to 9 carbon atoms.

11. The method of combatting insects which comprises subjecting them to the action of a compound selected from the group consisting of—

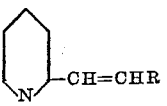 

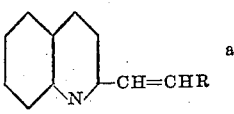 and 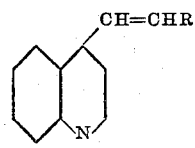

in which R denotes an organic radical containing from 3 to 9 carbon atoms.

WILLIAM A. KNAPP.
LEON J. HEUSER.

REFERENCES CITED

The following references are of record in the file of this patent:

UNITED STATES PATENTS

| Number | Name | Date |
|---|---|---|
| 2,212,529 | Swaine | Aug. 7, 1940 |
| 2,349,896 | Wilson et al. | May 30, 1944 |
| 2,388,499 | Riethof | Nov. 6, 1945 |

OTHER REFERENCES

Merck, Berichte, 21, 1888, pages 2709–11.
Spreck, Berichte, 20, 1887, pages 2044–46.